(No Model.)
C. E. NICHOLS.
PISTON ROD EXTRACTOR.
No. 579,803. Patented Mar. 30, 1897.
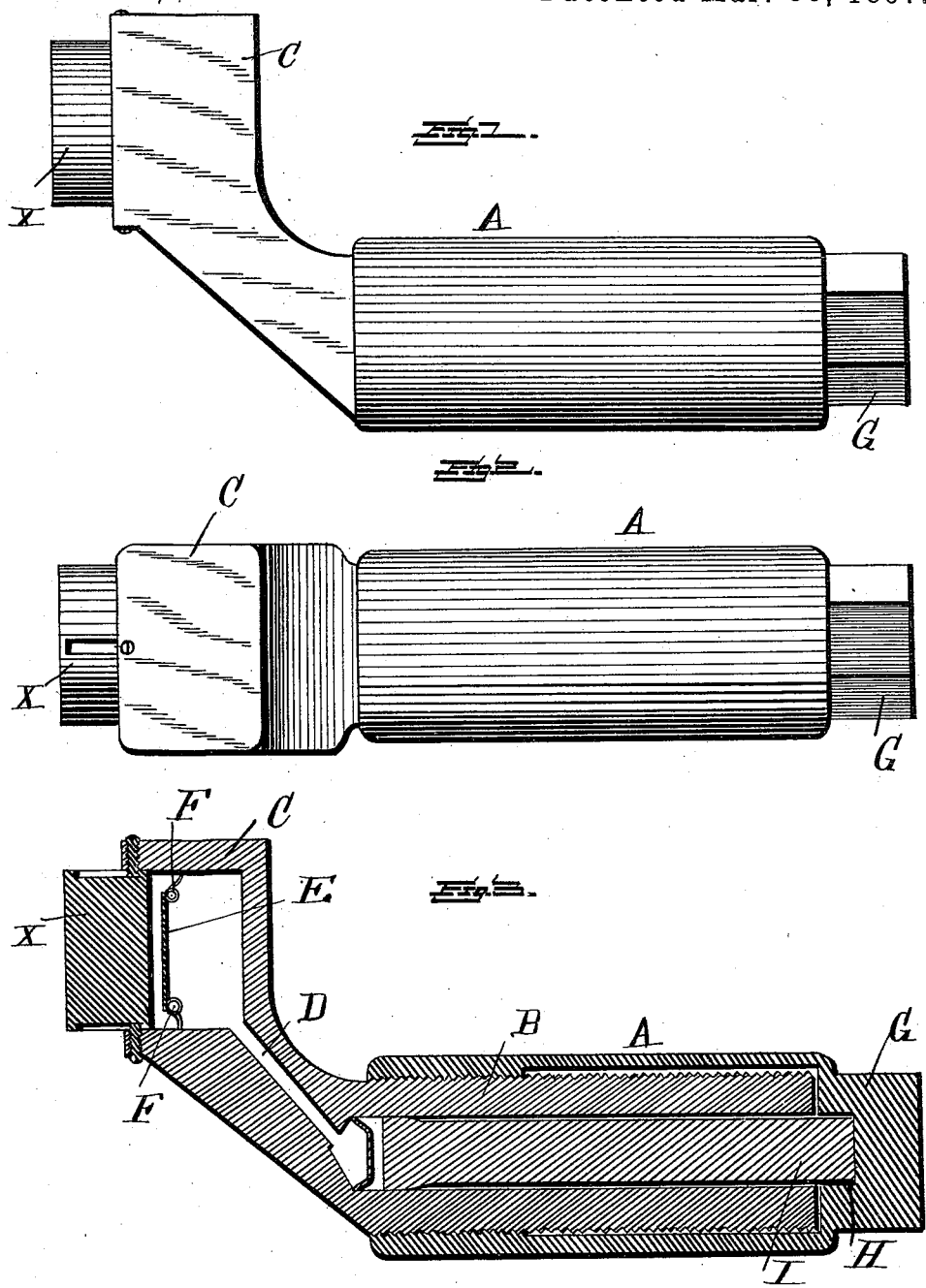

UNITED STATES PATENT OFFICE.

CHARLES E. NICHOLS, OF MANDAN, NORTH DAKOTA.

PISTON-ROD EXTRACTOR.

SPECIFICATION forming part of Letters Patent No. 579,803, dated March 30, 1897.

Application filed April 20, 1896. Serial No. 588,296. (No model.)

*To all whom it may concern:*

Be it known that I, CHARLES E. NICHOLS, a citizen of the United States, residing at Mandan, in the county of Morton and State of North Dakota, have invented certain new and useful Improvements in Piston-Rod Extractors; and I do hereby declare the following to be a full, clear, and exact description of the invention, such as will enable others skilled in the art to which it appertains to make and use the same.

This invention relates to certain new and useful improvements in piston-rod extractors; and it has for its object, among others, to provide a simple and cheap, yet durable and efficient, device of this character by means of which the most obstinate piston can be removed from the cross-head. By my construction I am enabled to overcome a resistance of over one hundred tons.

Other objects and advantages of the invention will hereinafter appear, and the novel features thereof will be specifically defined by the appended claims.

The invention in this instance resides in the peculiar combinations and the construction, arrangement, and adaptation of parts, all as more fully hereinafter described, shown in the drawings, and then particularly pointed out in the claims.

The invention is clearly illustrated in the accompanying drawings, which, with the letters of reference marked thereon, form a part of this specification, and in which—

Figure 1 is an elevation of my improved device. Fig. 2 is a top plan. Fig. 3 is a substantially central vertical longitudinal section through the same.

Like letters of reference indicate like parts throughout the several views.

Referring now to the details of the drawings by letter, A designates the main body of the device, which is composed of two cylinders of equal cubical capacity, but of different diameters, which enables one to gain great power when the diameter of the screw and the pitch of the thread are compared, the diameter being two and one-quarter inches and the pitch of thread eight to the inch. The cylinder B is connected with the cylinder C by the inclined passage D, as shown in Fig. 3. In the larger cylinder C is a leather washer E, urged outward by the spring F acting thereagainst, as seen in Fig. 3. This spring-actuated washer serves the purpose of a piston and avoids the necessity of a piston-rod, and by reason of its springs it is self-adjusting.

G is a nut engaging the threads on the periphery of the cylinder B, as shown, and provided at its end with the socket or cavity H, into which is engaged one end of the forcing-piston I, which works in the cylinder B, its inner end fitting water and oil tight therein. Piston I is made tight in any suitable manner, as well as the one in cylinder B, but no wire spring is used to urge it out against the cylinder.

The operation is as follows: Place the cylinder C in a vise, place the piston X, which is not to be removed, but simply pressed back into the cylinder by means of the vise, against one jaw, and then unscrew the nut G and at the same time tighten the vise, thus forcing the piston X back into the cylinder, which at the same time forces the oil in the cylinder C in through the inclined passage D, connecting the two cylinders and forcing the piston I into the socket in the nut. It is then ready to do its work by placing the piston X against the end of the rod to be removed with its cylinder resting against the cross-head or wrist-pin. Then with a suitable wrench turn the nut G on, forcing the piston I in and at the same time the piston X out through the medium of the oil passing through the small hole connecting the two cylinders. This will remove the most obstinate piston-rod from the cross-head.

Modifications in detail may be resorted to without departing from the spirit of the invention or sacrificing any of its advantages.

The invention is not to be confined to any one purpose, for I find it very useful in many ways other than removing piston-rods from cross-heads. It is equally useful for removing tight bolts in cramped or small places about an engine where a blow cannot be struck with a hammer or any other tool.

What is claimed as new is—

1. In a device for the purpose described, the combination of two cylinders of the same cubical capacity of contents but of different diameters, connected by a small inclined passage, the spring-actuated washer in the larger cylinder, the piston in the smaller cylinder, the piston in the other, and the nut, substantially as specified.

2. In a device for the purpose described the combination of the two cylinders of the same cubical capacity of contents but of different diameters connected by a small inclined passage, the spring-actuated washer and the piston in the cylinder of greater diameter, the piston in the other cylinder, the oil in the space between the two cylinders, and the nut on the end of the cylinder of smaller diameter and provided with a socket to receive the end of its piston, substantially as described.

In testimony whereof I have signed this specification in the presence of two subscribing witnesses.

CHARLES E. NICHOLS.

Witnesses:
   MICHAEL FAGAN,
   CHAS. F. RADKE.